US011421762B2

(12) United States Patent
Mellor (10) Patent No.: US 11,421,762 B2
(45) Date of Patent: Aug. 23, 2022

(54) RECIRCULATING BALL SCREW ROTARY ACTUATOR

(71) Applicant: The Boeing Company, Chicago, IL (US)

(72) Inventor: Mitchell Mellor, Bothell, WA (US)

(73) Assignee: The Boeing Company, Chicago, IL (US)

( * ) Notice: Subject to any disclaimer, the term of this patent is extended or adjusted under 35 U.S.C. 154(b) by 336 days.

(21) Appl. No.: 16/837,266

(22) Filed: Apr. 1, 2020

(65) Prior Publication Data

US 2021/0310547 A1 Oct. 7, 2021

(51) Int. Cl.
*F16H 25/22* (2006.01)
*B64C 9/00* (2006.01)
*B64C 13/30* (2006.01)
*F16H 25/20* (2006.01)

(52) U.S. Cl.
CPC ........... *F16H 25/2204* (2013.01); *B64C 9/00* (2013.01); *B64C 13/30* (2013.01); *F16H 2025/2062* (2013.01)

(58) Field of Classification Search
CPC ......... F16H 2025/2059; F16H 25/2204; F16H 2025/2062; B64C 13/30; B64C 9/00
See application file for complete search history.

(56) References Cited

U.S. PATENT DOCUMENTS

| 2,959,064 | A | * | 11/1960 | Geyer | F16H 25/20 |
| | | | | | 92/33 |
| 3,187,592 | A | * | 6/1965 | Geyer | F01B 9/04 |
| | | | | | 92/33 |
| 3,213,702 | A | | 10/1965 | Deehan et al. | |
| 3,339,463 | A | * | 9/1967 | Updegrave | B66C 13/18 |
| | | | | | 384/114 |
| 3,834,283 | A | * | 9/1974 | Beichel | F15B 15/068 |
| | | | | | 92/33 |
| 4,313,367 | A | * | 2/1982 | Weyer | F16C 17/10 |
| | | | | | 92/33 |
| 4,590,816 | A | * | 5/1986 | Weyer | F15B 15/068 |
| | | | | | 74/424.89 |
| 4,691,582 | A | * | 9/1987 | Weyer | F16H 25/2204 |
| | | | | | 74/89.42 |

(Continued)

FOREIGN PATENT DOCUMENTS

WO WO8802720 A1 4/1988

*Primary Examiner* — Terence Boes
(74) *Attorney, Agent, or Firm* — Quinn IP Law (57) ABSTRACT

A rotary actuator for a hinged panel assembly, e.g., of a fixed-wing aircraft, includes ball bearings, an outer cylinder, a piston, and an inner shaft. The outer cylinder admits fluid pressure from a fluid pressure supply. The piston is circumscribed by the outer cylinder. The piston, outer cylinder, and ball bearings collectively forming an outer ball screw. The piston translates along a longitudinal center axis in response to the fluid pressure. The inner shaft is circumscribed by the piston, with the inner shaft, piston, and ball bearings collectively forming an inner ball screw that is concentric with the outer ball screw. The ball screws form an interlaced ball circuit with one or more shared ball paths. Piston translation rotates the piston and inner shaft, and to thereby recirculates the ball bearings between the outer ball screw and the inner ball screw through the interlaced ball circuit.

20 Claims, 6 Drawing Sheets

(56) References Cited

U.S. PATENT DOCUMENTS

| | | | |
|---|---|---|---|
| 4,738,415 A | 4/1988 | Weyer | |
| 4,945,779 A | 8/1990 | Williams | |
| 6,361,033 B1 * | 3/2002 | Jones | F15B 15/068 280/5.511 |
| 2017/0335932 A1 | 11/2017 | Nguyen et al. | |

* cited by examiner

RECIRCULATING BALL SCREW ROTARY ACTUATOR

BACKGROUND

Fluid-powered linear and rotary actuators are used in a wide range of dynamic systems to impart torque and linear forces to a driven load. Ball screw assemblies are a commonly encountered type of linear actuator. A typical ball screw assembly uses a relatively low thread pitch in order to realize high linear force and translation in response to a relatively low input torque. Rotary actuators often include electric motors, which may be mechanically coupled to a driven load and selectively energized via a multi-cell battery pack or another electrical power supply. An energized motor responds by generating output torque, which can then be transmitted to the coupled driven load. Rotary actuators may also be fluidically actuated, such as in the case of rotary vanes and rack-and-pinion actuators. Thread-on-thread acme screw assemblies are yet another example actuator commonly used to impart forces to a driven load. However, due to high levels of friction along interfacing screw threads, acme screws are more commonly employed in applications in which such friction and possible failure modes stemming therefrom are relatively well tolerated.

SUMMARY

A compact rotary actuator is disclosed herein that, in its various embodiments, is configured to provide high torque efficiency and low friction relative to the conventional actuators described generally above. The rotary actuator may be employed as an on-axis or an off-axis solution for efficiently driving a revolute hinged joint of a hinged panel assembly. Representative hinged panel assemblies include, without limitation, aerodynamic flight control surfaces/panels such as flaps, ailerons, rudders, trim tabs, or struts disposed on the wings and empennage of a fixed-wing aircraft, e.g., a thin-wing airplane. Other aeronautical applications may benefit from the present teachings, including but not limited to landing gear doors and cargo doors, with the described rotary actuator also having utility across other industries requiring compact/high-efficiency rotary actuation.

As set forth in detail below, the rotary actuator of the present disclosure forms or defines two concentric ball screws sharing/recirculating ball bearings therebetween via an interlaced ball circuit having one or more shared ball paths. One of the ball screws is positioned radially within the other ball screw relative to a longitudinal center axis of the rotary actuators, and therefore the two ball screws are referred to herein as outer and inner ball screws for added clarity.

In the disclosed embodiments, one or two pistons translate within an outer cylinder in response to admitted fluid pressure from an external pressure supply. When this occurs, the outer and inner ball screws translate in opposite axial directions, with the translational motion and resulting rotation of the piston(s) ultimately causing the ball bearings to recirculate between the inner and outer ball screws. This occurs fully within the envelope of the outer cylinder, and thus the rotary actuator is characterized by an absence of an external ball return path. Instead, the ball bearings roll within and translate along the one or more shared ball paths, which may be embodied as a single continuous ball path or as multiple shared ball paths, with the shared ball path(s) collectively forming the above-noted interlaced ball circuit. Piston rotation ultimately imparts rotation to the inner shaft, which in turn is coupled to a driven load such as but not limited to the above-noted revolute hinged joint or hinged panel assembly.

The outer cylinder defines a set of helical or spiral grooves forming female threads of the outer ball screw. The piston, which translates within the outer cylinder by virtue of differential pressure across a piston face, has an outer diameter that includes male threads of the outer ball screw. The piston's inner diameter includes female threads of the inner ball screw. The inner shaft, which is circumscribed by the piston and the outer cylinder, includes male threads of the inner ball screw. Thus, the inner shaft is caused to rotate with respect to the piston by action of the inner ball screw.

The rotary actuator of the present disclosure may be optionally positioned on-axis with the revolute hinge joint of such a hinged panel assembly, which in the example of a thin-wing aircraft would eliminate the need to house associated crank assemblies and mechanical linkages within large underwing canoe fairings. Other configurations position the rotary actuator off-axis from the revolute hinge joint and connect to the revolute hinge joint via one or more mechanical links.

In a disclosed non-limiting embodiment, the rotary actuator includes a plurality of ball bearings, an outer cylinder, a piston, and an inner shaft. The outer cylinder has multiple fluid ports each configured to admit fluid pressure from a fluid pressure supply. The piston is circumscribed by the outer cylinder. The piston, the outer cylinder, and the ball bearings collectively form an outer ball screw. Additionally, the piston is configured to translate along a longitudinal center axis of the rotary actuator in response to the fluid pressure. The inner shaft is circumscribed by the piston, with the inner shaft, the piston, and the ball bearings collectively forming an inner ball screw that is concentric with the outer ball screw about the longitudinal center axis.

In this embodiment, the outer ball screw and the inner ball screw together form an interlaced ball circuit having one or more shared ball paths. Translation of the piston along the longitudinal center axis in response to the fluid pressure has the dynamic effect of rotating, i.e., is operative to rotate, the piston and the inner shaft, which action thereby recirculates the ball bearings between the outer ball screw and the inner ball screw through the interlaced ball circuit.

Also disclosed herein is a hinged panel assembly. According to a disclosed illustrative embodiment, the hinged panel assembly includes a rotary actuator and a revolute hinged joint interconnecting a first panel and a second panel, and having an axis of rotation. The rotary actuator is connected to the revolute hinged joint and includes a rotatable inner shaft, a piston, an outer cylinder, and a plurality of ball bearings. The inner shaft is connected to the axis of rotation of the revolute hinged joint. The piston circumscribes the rotatable inner shaft, and is configured to translate along a longitudinal center axis of the rotary actuator in response to fluid pressure. The outer cylinder circumscribes the piston and has multiple fluid ports each configured to admit the fluid pressure.

The rotatable inner shaft, the piston, and the outer cylinder are concentrically arranged with respect to the longitudinal center axis to form two concentric ball screws that together define the above-noted interlaced ball circuit, with the ball bearings being positioned within the at least one shared ball path of the interlaced ball circuit. Translation of the piston along the longitudinal center axis in response to admission of the fluid pressure into the outer cylinder is operative to recirculate the ball bearings between the two concentric ball screws via the at least one shared ball path, and to rotate the piston and the inner shaft to thereby actuate the revolute hinged joint and change an angular position of the first panel with respect to the second panel.

A fixed-wing aircraft is also disclosed herein. A representative embodiment of the fixed-wing aircraft includes a pair of wings and an empennage connected to the fuselage, an aerodynamic flight control panel connected to one of the wings and/or to the empennage via a revolute hinged joint having an axis of rotation, and a rotary actuator connected to the revolute hinged joint and configured as set forth herein.

The above summary is not intended to represent every embodiment or every aspect of the present disclosure. Rather, the foregoing summary merely provides an exemplification of some of the novel concepts and features set forth herein. The above features and advantages, and other features and advantages, will be readily apparent from the following detailed description of illustrated embodiments and representative modes for carrying out the disclosure when taken in connection with the accompanying drawings and appended claims. Moreover, this disclosure expressly includes any and all combinations and sub-combinations of the elements and features presented above and below.

The present disclosure may be extended to modifications and alternative forms, with representative embodiments shown by way of example in the drawings and described in detail below. Inventive aspects of the disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Background, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa, e.g., "a" means "at least one" or "one or more"; the words "and" and "or" shall be both conjunctive and disjunctive; the words "any" and "all" shall both mean "any and all"; and the words "including", "containing", "comprising", "having", and the like shall each mean "including without limitation". Moreover, words of approximation such as "about", "almost", "substantially", "approximate", "approximately", "generally", and the like may be used herein in the sense of "at, near, or nearly at", "within 0-5% of", "within acceptable manufacturing tolerances", or any logical combination thereof.

Figure 1:
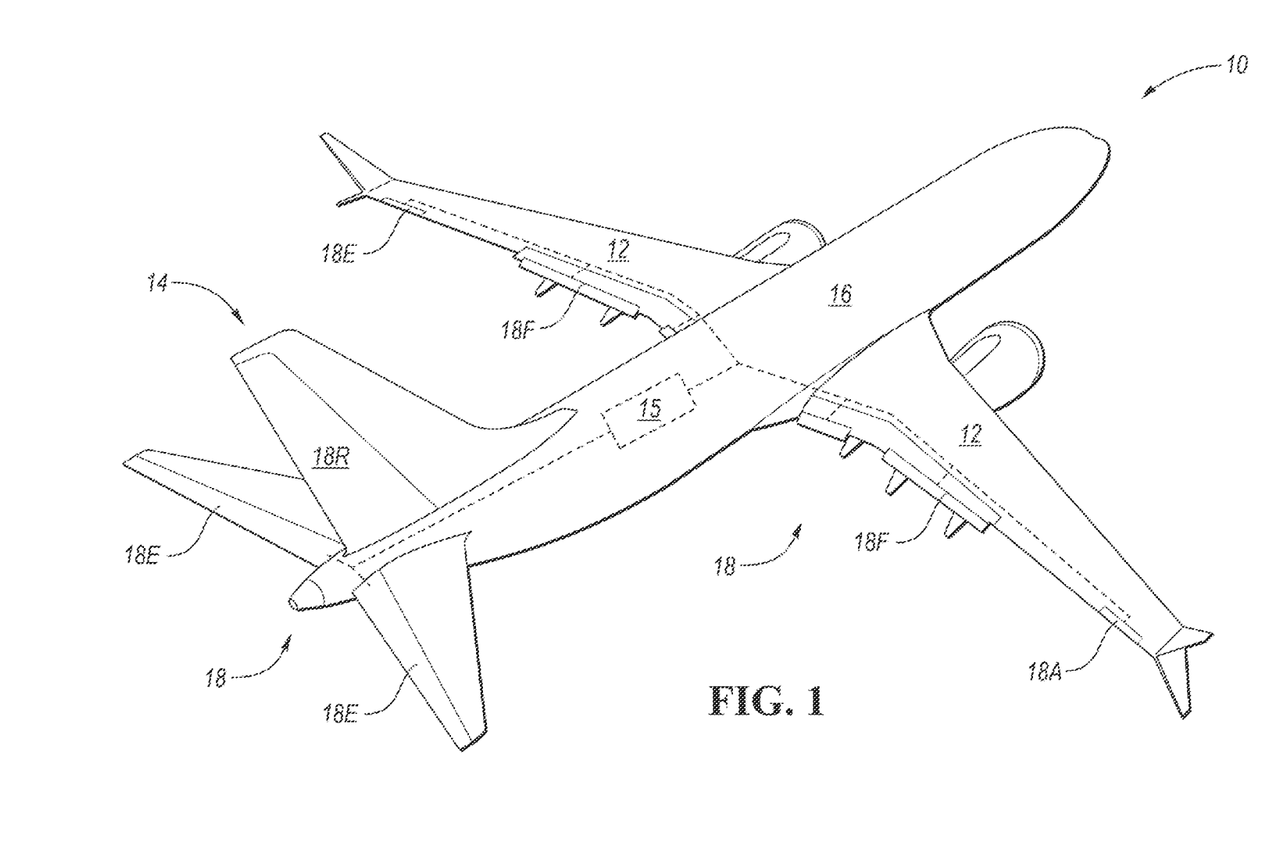
FIG. 1 is a schematic illustration of an exemplary fixed-wing aircraft having aerodynamic flight control surfaces each being actuatable via a corresponding compact rotary actuator of the types described herein.

Referring to the drawings, wherein like reference numbers refer to like features throughout the several views, an exemplary aircraft 10 is depicted in FIG. 1. The aircraft 10, e.g., a fixed-wing aircraft as shown, includes a pair of main wings 12 and an empennage 14 connected to a fuselage 16. As will be appreciated by those of ordinary skill in the art, the wings 12 and the empennage 14 include various aerodynamic flight control surfaces or panels shown generally at 18. For instance, each of the wings 12 may have one or more controllable flaps 18F and ailerons 18A, while the empennage 14 includes a rudder 18R and elevators 18E. Other aerodynamic flight control panels 18 not explicitly shown in FIG. 1 but well understood in the art, such as but not limited to spoilers, trim tabs, slats, etc., may be used at other locations of the aircraft 10, and therefore the configuration and use of the aerodynamic flight control panels 18 may vary with the application and the configuration of the aircraft 10.

Each of the aerodynamic flight control panels 18 is independently-actuatable via a respective compact rotary actuator 20 (FIGS. 3 and 4) or 200 (FIG. 6) constructed in accordance with the present disclosure. Each rotary actuator 20 and/or 200 used aboard the aircraft 10 is in fluid communication with a fluid pressure supply 15. In the illustrated exemplary aeronautical application, the fluid pressure supply 15 may be optionally embodied as a hydraulic fluid circuit of the aircraft 10 inclusive of a hydraulic fluid pump, valves, fittings, hoses, and fluid filters, none of which are shown but all of which are well understood in the art.

The respective angular positions of the various aerodynamic flight control panels 18 depicted in FIG. 1 are selectively changed by a pilot of the aircraft 10 or autonomously by an onboard flight control or avionics unit (not shown) by admitting fluid pressure from the fluid pressure supply 15 into the rotary actuator 20 as set forth below. While the exemplary embodiments used herein to illustrate the present teachings contemplate the use of hydraulic fluid pressure for this purpose, other embodiments may be envisioned in which actuation of the aerodynamic flight control panels 18 is achieved in other ways, such as by using compressed air or gas/pneumatic actuation. For illustrative simplicity, the aerodynamic flight control surfaces 18 of the present disclosure will be described below as being hydraulically-actuated without limiting actuation to such a motive form.

Figure 2A:
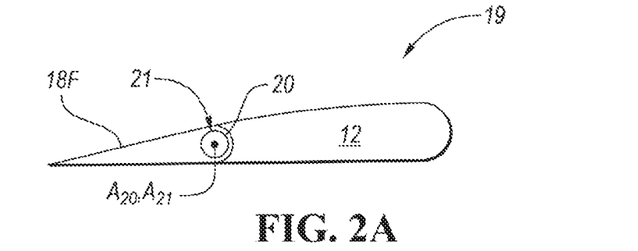
FIGS. 2A and 2B are schematic illustrations of a representative hinged aerodynamic flight control panel having a hinge axis powered via a rotary actuator of the present disclosure.
Figure 2B:
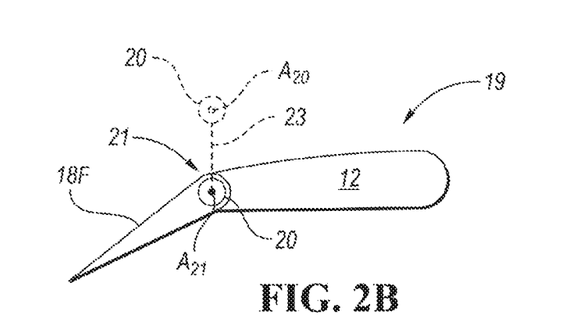
Figure 2C:
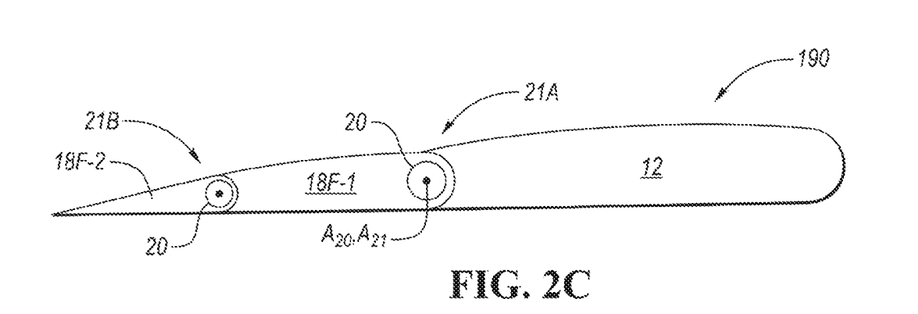
FIGS. 2C and 2D are schematic illustrations of a representative hinged aerodynamic flight control panel having two hinge axes each powered via a respective rotary actuator.
Figure 2D:
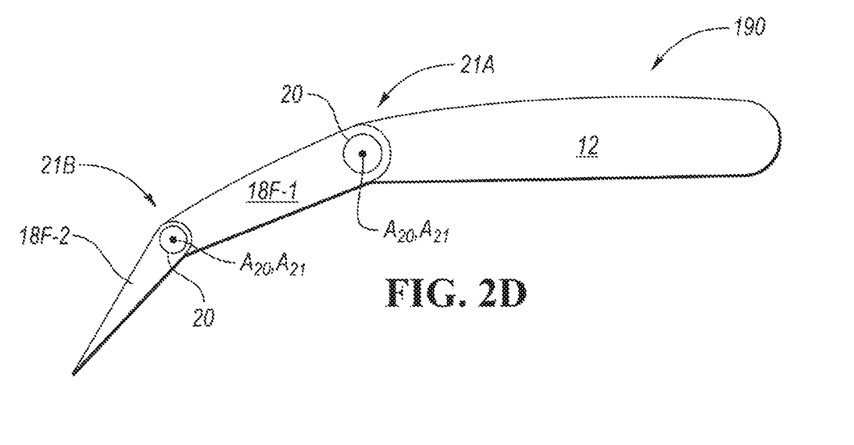

In FIGS. 2A and 2B, a hinged panel assembly 19 is shown in which a first panel, in this instance one of the wings 12 of FIG. 1, is connected to a second panel, in this case a flap 18F, via a revolute hinged joint 21, with the revolute hinged joint 21 having an axis of rotation or hinge axis $A_{21}$. FIGS. 2A and 2B respectively depict "flap up" and "flap down" configurations of a representative aerodynamic flight control panel 18, with other panels 18 as shown in FIG. 1 being similarly situated in other embodiments. FIGS. 2C and 2D similarly depict "flap up" and "flap down" configurations of another hinged panel assembly 190, with the notable difference being that the representative flap 18F shown in FIGS. 2A and 2B is replaced in FIGS. 2C and 2D by a two-piece flap assembly, i.e., a leading flap 18F-1 and a trailing flap 18F-2, with "leading" and "trailing" referring to relative position relative to airflow over the wing 12. The respective lead and trailing flaps 18F-1 and 18F-2 are rotatably interconnected via a revolute hinged joint 21B.

In the configurations of FIGS. 2A-2D, the flap 18F and the lead flap 18F-1 are rotatably connected to the wing 12 using a revolute hinged joint 21 or 21A, respectively. A benefit of the rotary actuator 20 is its compact size and high torque efficiency. This enables the rotary actuator 20 to be located on/coaxially with the hinge axis $A_{21}$ of the hinged joint 21, 21A, or 21B. In the illustrated embodiment of FIG. 2A, for instance, the rotary actuator 20 is positioned on the hinge axis $A_{21}$ such that a longitudinal center axis $A_{20}$ of the rotary actuator 20 and the hinge axis $A_{21}$ are coaxially aligned. Such coaxial arrangement reduces the required packaging envelope for the rotary actuators 20 and the various mechanical arms or linkages that would otherwise be required, e.g., beneath the wings 12 in large canoe fairings of the type. Thus, the aircraft 10 of FIG. 1 when constructed using the present rotary actuator 20 may be characterized by an absence of such underwing fairings, with an accompanying beneficial reduction in weight and drag.

Shown in a phantom line in FIG. 2B to represent an optional alternative off-axis configuration, it is also possible to position the rotary actuator 20 a short distance apart from the hinge axis $A_{21}$ and use one or more mechanical linkages 23 to connect the rotary actuator 20 to the hinged revolute joint 21. Such a configuration may also be used with the representative embodiment of FIGS. 2C and 2D, as well as with other flight control panels 18 of FIG. 1. Thus, while on-axis placement of the rotary actuator 20 provides the above-noted and other possible advantages, the present rotary actuator 20 may be used off-axis within the scope of the present disclosure, for instance as retrofit or aftermarket replacements for larger and less efficient actuators of the type commonly housed in underwing fairings as noted above.

Figure 3:
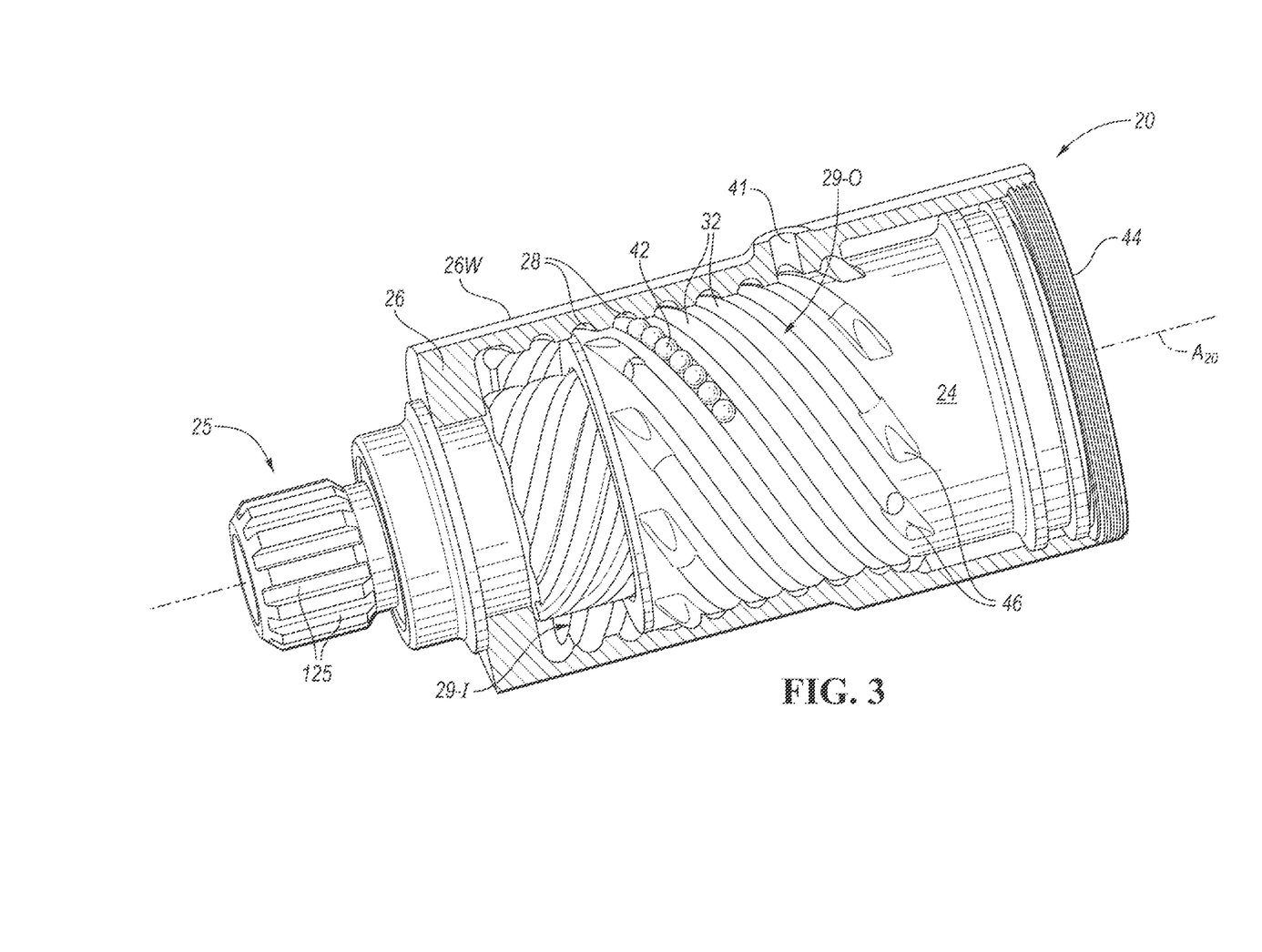
FIG. 3 is a partial cross-sectional perspective view illustration of the rotary actuator according to a possible single-piston embodiment.
Figure 4:
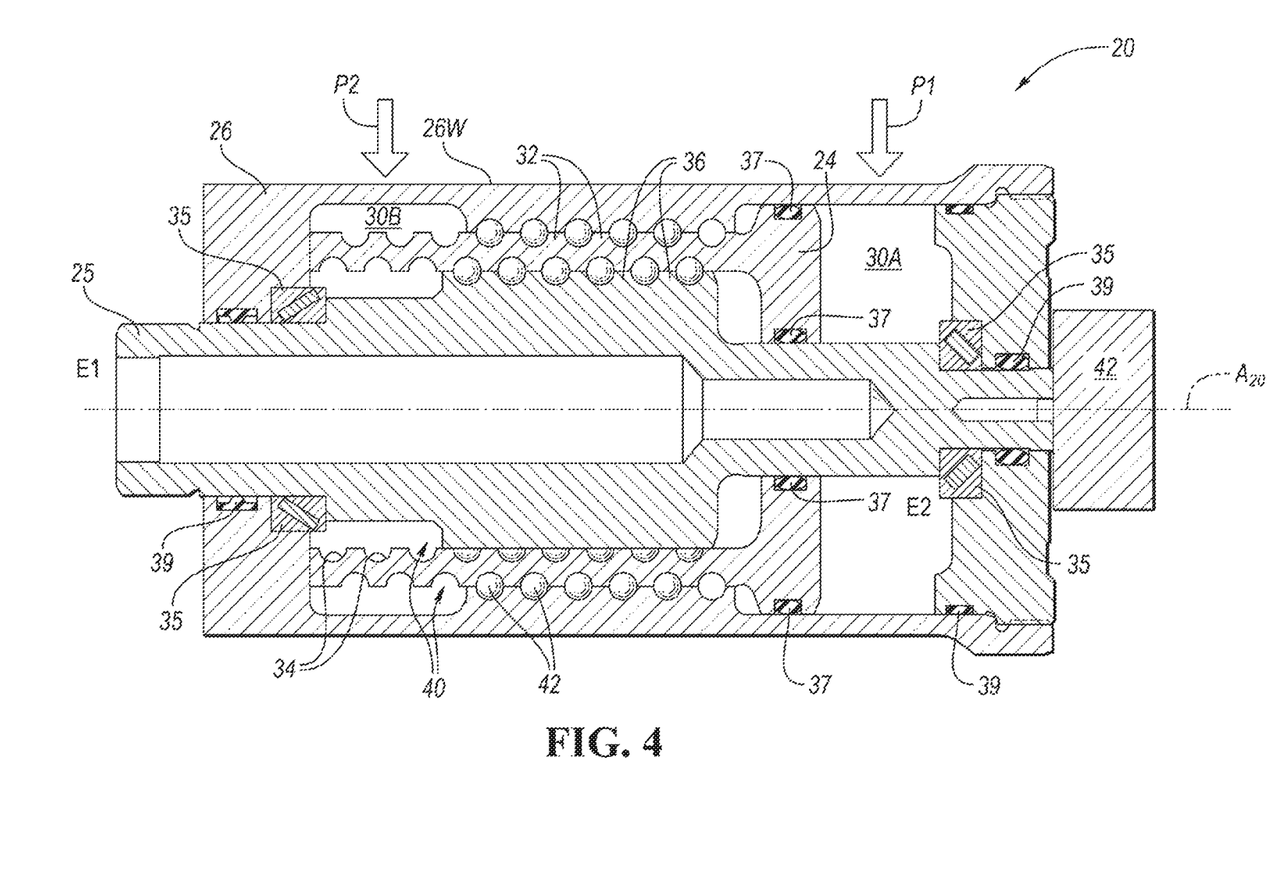
FIG. 4 is a schematic cross-sectional illustration of the rotary actuator shown in FIG. 3.

Referring to FIGS. 3 and 4, the rotary actuator 20 incorporates two concentric/outer and inner ball screws in order to convert linear motion of a reciprocating piston 24 into rotary motion of an inner shaft 25. The inner shaft 25 may include a plurality of radial teeth or splines 125 as shown to facilitate meshing engagement of the inner shaft 25 with a driven load, e.g., the revolute hinged joints 21, 21A, or 21B of FIGS. 2A-2D.

The rotary actuator 20 according to the exemplary embodiment of FIG. 3 includes three main components: the piston 24, the inner shaft 25, and an outer cylinder 26, with the three main components being coaxially arranged with respect to the longitudinal center axis $A_{20}$ of the rotary actuator 20. Thus, the longitudinal center axis $A_{20}$ is the longitudinal center axis of each of the piston 24, the inner shaft 25, and the outer cylinder 26. As described below in further detail, alternating fluid pressure is admitted into opposing ends of the outer cylinder 26 as indicated by arrows $P_1$ and $P_2$. Such fluid pressure is selectively admitted into the outer cylinder 26 through a corresponding fluid port 41, with one fluid port 41 being visible from the perspective of FIG. 3. Several ball bearings 42 are shown in FIG. 3 solely for illustrative simplicity. As will be appreciated by one of ordinary skill in the art, however, all of the depicted ball paths 40 would be filled with ball bearings 42 in an actual embodiment.

The multiple fluid ports 41 of the outer cylinder 26 may be formed in the outer cylinder 26 at an accessible location, i.e., as bores or holes through a perimeter wall 26W of the outer cylinder 26. The inner diameter of the outer cylinder 26 defines/includes female threads 28 of an outer ball screw 29-O. The outer diameter of the piston 24 defines or includes male threads 32 of the outer ball screw 29-O, with the inner diameter of the piston 24 defining or including female threads 34 of an inner ball screw 29-I. Similarly, an outer diameter of the inner shaft 25 defines or includes male threads 36 of the inner ball screw 29-I. The thread direction of the outer ball screw 29-O is opposite that of the inner ball screw 29-I, which ensures the desired motion and opposing translation.

As depicted, for example, the female threads 28 and male threads 32 of the outer ball screw 29-O are left-handed threads while the female threads 34 and male threads 36 of the inner ball screw 29-I are right-handed threads. However, the opposite may hold true in other embodiments, i.e., the female threads 28 and the male threads 32 of the outer ball screw 29-O may be right-handed threads, while the female threads 28 and the male threads 32 of the inner ball screw 29-I are left-handed threads.

The piston 24 is configured to separate the outer cylinder 26 into multiple pressure cavities, e.g., pressure cavities 30A and 30B as shown in FIG. 4. The multiple fluid ports 41 of the outer cylinder 26 are configured to fluidly connect the fluid pressure supply 15 (see FIG. 1) to the multiple pressure cavities 30A and 30B. The position and configuration of the piston 24 thereby creates a barrier between the oppositely-disposed (nominally "right" and "left") fluid cavities 30A and 30B. Differential pressure across the piston 24 is used to drive the piston 24 in one of two possible axial directions along the longitudinal center axis $A_{20}$, i.e., to the right or to the left from the perspective of FIGS. 3 and 4.

In general, the construction of the rotary actuator 20 ensures that the translation of the piston 24 along the longitudinal center axis $A_{20}$ causes the piston 24 to rotate with respect to and radially within the outer cylinder 26. Such rotation occurs by action of the outer ball screw 29-O. The inner shaft 25 is similarly caused to rotate with respect to the piston 24 by virtue of the inner ball screw 29-I and the translation of the piston 24. A number of shared ball paths 40 of the inner ball screw 29-I is also equal to a number of the shared ball paths 40 of the outer ball screw 29-O in some configurations.

In the illustrated single-piston representative embodiment of FIGS. 3 and 4, the piston 24 circumscribes the inner shaft 25, with axial ends E1 and E2 of the inner shaft 25 supported by a set of thrust bearings 35 (FIG. 4), and with sliding seals 37 positioned at sliding interfaces between the outer cylinder 26, the piston 24, and/or the inner shaft 25. Likewise, static seals 39 are used at static interfaces.

In some embodiments, an optional rotary position sensor 42 as shown schematically in FIG. 4 may be connected to the inner shaft 25 proximate an end cap 44 of the rotary actuator 20, with the end cap 44 configured to close off the cavities 30A and 30B. The rotary position sensor 42 is configured to measure and report the angular position of the inner shaft 25, e.g., to an external electronic control unit (not shown). Various sensor types may be used for such a purpose, including but not limited to a rotary variable differential transformer or a rotary encoder.

Figure 5:
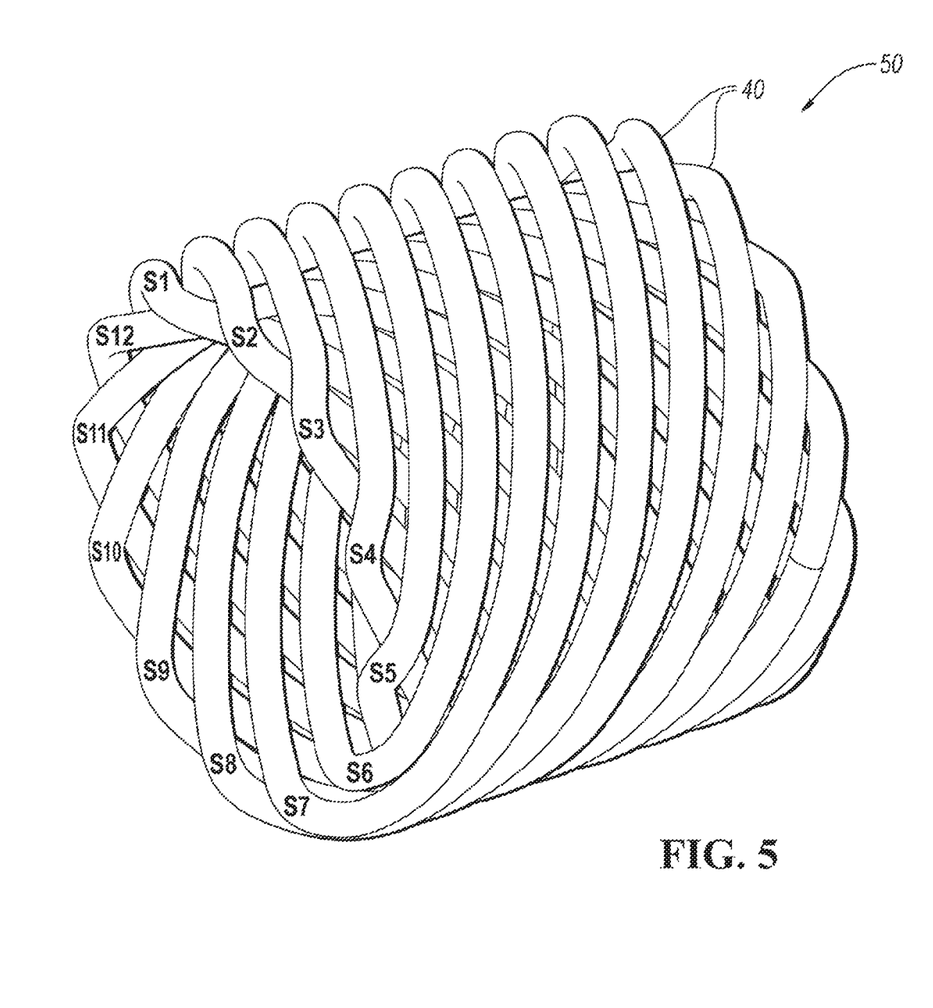
FIG. 5 is a schematic perspective view illustration of an exemplary interlaced ball circuit formed from multiple shared ball paths that may be incorporated into the construction of the rotary actuators disclosed herein.

The outer cylinder 26 shown in FIGS. 3 and 4 surrounds/circumscribes the piston 24 such that the inner shaft 25, the piston 24, and the outer cylinder 26 are concentrically arranged with respect to the longitudinal center axis $A_{20}$ as noted above, thereby collectively forming the concentric inner and outer ball screws 29-I and 29-O. Together, the inner and outer ball screws 29-I and 29-O include one or more helical or spiral grooves that collectively define the at least one shared ball path 40, for instance a single continuous ball path 40 passing through and forming an integral part of the inner ball screw 29-I and the outer ball screw 29-O, or multiple shared ball paths 40 as shown in FIG. 5. A plurality of ball bearings 42 is positioned within the shared ball path(s) 40. While the ball bearings 42 are shown as being approximately the same diameter for illustrative simplicity, the ball bearings 42 may have different diameters, e.g., with alternating larger and smaller ball diameters, and with adjacent ball bearings 42 rotating in different directions while translating in the same direction along the shared ball path(s) 40. Materials of construction of the ball bearings 42 may also vary with the intended application, with exemplary steel or ceramic embodiments being useful in a wide range of applications.

As best shown in FIG. 3, ball guides 46 are formed in transitions of the shared ball path(s) 40 to enable a smooth transfer of the ball bearings 42 from the outer ball screw 29-O to the inner ball screw 29-I. Translation of the piston 24 along the longitudinal center axis $A_{20}$ provides motive force for recirculating the ball bearings 42 within the shared ball path(s) 40 between the inner and outer ball screws 29-I and 29-O, respectively. The piston 24 is further configured to rotate about the longitudinal center axis $A_{20}$ as the piston 24 translates along axis $A_{20}$, thereby making the longitudinal center axis $A_{20}$ an axis of rotation of the piston 24 and the inner shaft 25.

Regarding the ball bearings 42 and the shared ball path(s) 40, this particular aspect of the present disclosure ensures that the rotary actuator 20 is able to recirculate the ball bearings 42 between the respective outer and inner ball screws 29-O and 29-I while operating with significantly reduced friction relative to conventional thread-on-thread screw actuators. The ball bearings 42 that contact the inner shaft 25 and the piston 24 recirculate radially within the outer cylinder 26 to contact the outer cylinder 26, with the ball bearings 42 still remaining in rolling contact with the piston 24. The rotary or angular speed of the piston 24 as this occurs is approximately half of the rotary speed of the inner shaft 25, with friction due to the rotation and translation of the piston 24 radially within the outer cylinder 26 causing the ball bearings 42 to translate at a constant speed. That is, a speed of translation of the plurality of ball bearings 42 within the inner ball screw 29-I is equal to a speed of translation of the plurality of ball bearings 42 within the outer ball screw 29-O.

To further optimize the present construction, the rotary actuator 20 may use a relatively high thread pitch to provide one full rotation of the inner shaft 25 for every two or more inches of translation of the piston 24. A high thread pitch is intended to ensure that output torque provided on the inner shaft 25 remains sufficiently high and that linear input forces remains sufficiently low. A benefit of the present rotary actuator 20 configuration is its ability to back-driven, e.g., by applying a manual or electric torque to the inner shaft 25 if needed in the event of seizing of the ball bearings 42. A high thread pitch relative to conventional ball screws also allows multiple thread/ball starts to be oriented around the piston 24, the outer cylinder 26, and the inner shaft 25.

Moreover, a higher number of thread/ball starts allows more ball bearings 42 to be used for the purpose of carrying greater contact loads. As a non-limiting illustrative example, as many as eighteen (18) thread/ball starts may be used on each of the inner and outer ball screws 29-I and 29-O. Each thread/ball start may be rotated 20 degrees from the previous thread/ball start. However, a different number of thread/ball starts could also be used based on the required size of the rotary actuator 20 and the size of the ball bearings 42, and therefore the depicted embodiments are representative of the present teachings and non-limiting.

Referring briefly to FIG. 5, an example interlaced ball circuit 50 includes at least six shared ball paths 40 with a total of twelve (12) different thread/ball starts, each of which is nominally labeled S1 through S12 for clarity. The illustrated construction is a false solid/3D representation of the ball paths 40 defined within the outer and inner ball screws 29-O and 29-I, as will be appreciated by those of ordinary skill in the art. Also, the depicted ball paths 40 would be completely filled with ball bearings 42 in an actual embodiment, as noted above, such that the ball bearings 42 in the outer ball screw/outer ball circuit will tend to push the ball bearings 42 to the inner ball screw/inner ball circuit. Likewise, the ball bearings 42 in the inner ball screw 29-I will tend to push the ball bearings 42 through to the outer ball screw 29-O, with ball paths 40 extending between the respective inner and outer ball screws 29-I and 29-O effectively forming an internal ball return path.

In the illustrated embodiment, ball paths 40 with ball starts S1 and S7 are interconnected, as are ball paths 40 having ball starts S2 and S8, and continuing in this manner, i.e., S3 and S9, S4 and S10, S5 and S11, and S6 and S12. Use of multiple ball paths 40 as depicted in FIG. 5 increases redundancy and reduces sliding friction within the rotary actuator 20. That is, if the ball bearings 42 of FIGS. 3 and 4 when translating through a given shared ball path 40 within the interlaced ball circuit 50 of FIG. 5 should happen to jam or seize up, the remaining ball bearings 42 within the interlaced ball circuit 50 would be unaffected. Such is not the case when using a single continuous ball path 40.

The ball guides 46 shown in FIG. 3 form transitions between shared ball paths 40 within the ball circuit 50, i.e., as bends or turns where a given ball bearing 42 moves from one shared ball path 40 to another, such as when moving from the outer ball screw 29-O to the inner ball screw 29-I. The turns should be designed to prevent impingement of the ball bearings 42. Given the complexity of the required surface geometry, additive manufacturing/3D printing methods such as selective laser melting may be optimal when constructing the interlaced ball circuit 50 and its various ball guides 46. Other combinations or numbers of ball starts and ball paths 40 are possible within the scope of the disclosure, e.g., nine thread/ball starts, and therefore the embodiment of FIG. 5 is intended to be illustrative of the present teachings and non-limiting.

Figure 6:
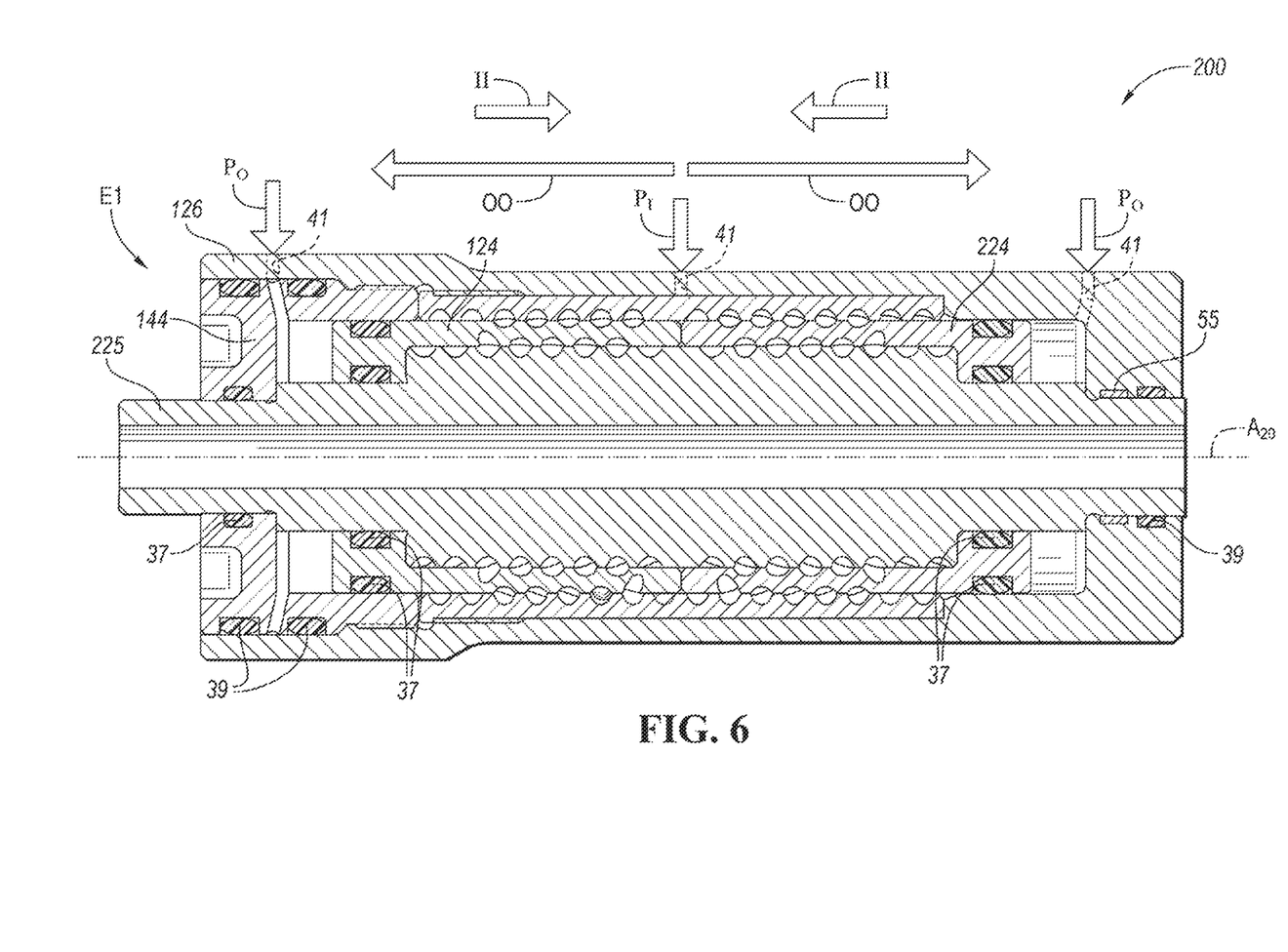
FIG. 6 is a schematic cross-sectional illustration of an alternative dual-piston embodiment of the rotary actuator shown in FIGS. 3 and 4.

To facilitate jam resistance of the ball bearings 42 within the interlaced ball circuit 50 exemplified in FIG. 5, especially in faster-acting embodiments of the rotary actuator 20 of FIGS. 3 and 4 or the dual-piston rotary actuator 200 shown in FIG. 6, one may use more and/or shorter shared ball paths 40, and may configured the curves and ball guides 46 with gradual bends, as will be appreciated by those of ordinary skill in the art. If the rotary actuator 20 is fast acting, the translation speeds of the captive ball bearings 42 will tend to be higher, and thus the effects of inertia will increase. For instance, if inertia causes a given ball bearing 42 to stop rolling within the interlaced ball circuit 50 as the ball bearings 42 translate therethrough, friction will increase, as will wear, thereby reducing operating efficiency.

Referring to FIG. 6, as an alternative to the single-piston rotary actuator 20 of FIG. 4, a dual-piston rotary actuator 200 may be constructed that includes first and second pistons 124 and 224, an outer cylinder 126, and an inner shaft 225. An end cap 144 that is analogous to the end cap 44 of FIG. 3 is disposed at a distal end E1. The rotary actuator 200 utilizes an inner fluid port 41 ($P_I$) flanked by a pair of outer fluid ports 41 ($P_O$), with the inner fluid port 41 ($P_I$) positioned at the approximate or exact axial midpoint of the rotary actuator 200. When fluid pressure is applied to the rotary actuator 200 via both of the outer pressure ports ($P_O$) 41, the respective first and second pistons 124 and 224 move toward each other as indicated by arrows II, with the inner pressure port 41 ($P_I$) in this case acting as an outlet port to exhaust captive fluid from the outer cylinder 126. Likewise, introduction of fluid pressure into the inner fluid port 41 ($P_I$) drives the pistons 124 and 224 in an axially-outward directions as indicated by arrows OO, with the outer fluid ports 41 ($P_O$) acting as outlet ports.

The exemplary dual-piston embodiment of FIG. 6 may help balance loads on the rotary actuator 200 in an optimal manner relative to the single-piston embodiment of FIGS. 3 and 4, albeit at the cost of added internal complexity. Thus, the configuration of FIG. 6 eliminates the need for the thrust bearings 35 depicted in FIG. 4. To ensure proper fluid sealing and load support, the sliding seals 37 are retained at interfacing surfaces of any sliding or translating components, with static seals 39 disposed at static interfaces and journal bearings 55 used to provide rotational support.

The exemplary rotary actuators 20 and 200 shown in FIGS. 3-4 and 6, respectively, allows for compact construction. Compact construction in turn is desirable in a multiple of applications, such as but not limited to actuation of the flight control panels 18 of FIG. 1, with possible up-sizing for applications such as actuation of cargo or landing gear doors. By using highly-efficient inner and outer ball screws 29-I and 29-O in lieu of high-friction acme screws, and the disclosed interlaced ball circuit 50 and shared ball path(s) 40 exemplified in FIG. 5, a high screw pitch solution is enabled such that the rotary actuators 20 or 200 could be selectively back-driven if needed by an applied torque to the inner shaft 25 (FIGS. 3 and 4) or 225 (FIG. 6).

It may be desirable for the thread pitch to be slightly different between the inner shaft 25 or 125 and the outer cylinder 26 or 126 of FIGS. 3 and 6, respectively, with other possible embodiments having the same thread pitch. Examples of a relatively high screw pitch within the scope of the disclosure include one rotation of the inner shaft 25 or 125 for two or more inches of stroke of the piston(s) 24, 124, or 224, e.g., approximately 3-4 inches per rotation in some embodiments. Moreover, use of a large thread pitch as enabled by the disclosed solutions allows for multiple thread starts, which in turn allows for more ball bearings 42 (see FIGS. 3 and 4) to be used to carry the contact loads between the various components.

For instance, nine thread/ball starts may be used on the respective inner and outer ball screws 29-I and 29-O, with each rotated 40 degrees from the previous start, with any number of starts usable in other embodiments based on the size of the rotary actuator 20 or 200 and the size of the ball bearings 42. Ideally, at least six and as many as twelve thread or ball starts may be considered optimal without rendering the construction unduly complex, without limitation. Such configurations may enable the inner shaft 25 or 225 to be rotated by about 60 degrees or more when the piston 24, 124, or 224 translates several inches as noted above, e.g., two or more inches.

The rotary actuators 20 and 200 described above therefore contemplate the use of concentric inner and outer ball screws 29-I and 29-O and recirculating ball bearings 42 to convert linear motion of one or more pistons, i.e., piston 24 of FIGS. 3 and 4 or first and second pistons 124 and 224 of FIG. 6, into rotational motion of the inner shaft 25 or 225. Among the many benefits disclosed herein, low-friction and compactness lend the present teachings to a wide range of applications outside of the aircraft 10 used herein as an illustrative example application. Likewise, disclosed example dimensions, ranges, materials of construction, and the like may be varied within the scope of the disclosure to suit a particular application. For instance, larger and/or more ball bearings 42 and a suitably upsized outer cylinder 26 or 126, piston(s) 24, 124 or 224, and inner shaft 25 or 225 may be used to support rotary applications in which actuation is required of a driven load having an increased mass relative to the flight control surfaces 18 of FIG. 1. These and other benefits will be readily appreciated by those of ordinary sill in the art in view of the foregoing disclosure.

Aspects of the present disclosure have been described in detail with reference to the illustrated embodiments. Those skilled in the art will recognize, however, that certain modifications may be made to the disclosed structure and/or methods without departing from the scope of the present disclosure. The disclosure is also not limited to the precise construction and compositions disclosed herein. Modifications apparent from the foregoing descriptions are within the scope of the disclosure as defined by the appended claims. Moreover, the present concepts expressly include combinations and sub-combinations of the preceding elements and features.

What is claimed is:

1. A rotary actuator comprising:
   a plurality of ball bearings;
   an outer cylinder having multiple fluid ports each configured to admit fluid pressure from a fluid pressure supply;
   a piston circumscribed by the outer cylinder, wherein the piston, the outer cylinder, and the plurality of ball bearings collectively form an outer ball screw, and wherein the piston is configured to translate along a longitudinal center axis of the rotary actuator in response to the fluid pressure; and
   an inner shaft circumscribed by the piston, wherein the inner shaft, the piston, and the plurality of ball bearings collectively form an inner ball screw that is concentric with the outer ball screw about the longitudinal center axis;
   wherein the outer ball screw and the inner ball screw together form an interlaced ball circuit having one or more shared ball paths, and wherein translation of the piston along the longitudinal center axis in response to the fluid pressure is operative to rotate the piston and the inner shaft, and to thereby recirculate the plurality of ball bearings between the outer ball screw and the inner ball screw through the interlaced ball circuit.

2. The rotary actuator of claim 1, wherein an inner diameter of the outer cylinder includes a plurality of female threads of the outer ball screw, an outer diameter of the piston includes a plurality of male threads of the outer ball screw, an inner diameter of the piston includes a plurality of female threads of the inner ball screw, and an outer diameter of the inner shaft includes a plurality of male threads of the inner ball screw.

3. The rotary actuator of claim 2, wherein the female threads and the male threads of the outer ball screw are left-handed threads, and the female threads and the male threads of the inner ball screw are right-handed threads.

4. The rotary actuator of claim 1, wherein the piston is configured to separate the outer cylinder into multiple pressure cavities, and the multiple fluid ports of the outer cylinder are configured to fluidly connect the fluid pressure supply to the multiple pressure cavities.

5. The rotary actuator of claim 1, further comprising a set of thrust bearings, wherein the piston is a single piston and each respective thrust bearing of the set of thrust bearings is disposed at opposing distal ends of the inner shaft.

6. The rotary actuator of claim 1, wherein the piston includes a pair of pistons, and the multiple fluid ports include an inner fluid port positioned at an approximate mid-point of the rotary actuator between the pair of pistons, and a pair of outer fluid ports flanking the inner fluid port.

7. The rotary actuator of claim 1, wherein the one or more shared ball paths includes at least six shared ball paths.

8. The rotary actuator of claim 7, wherein the one or more shared ball paths includes ten or fewer shared ball paths.

9. The rotary actuator of claim 1, wherein a number of the shared ball paths of the inner ball screw is equal to a number of the shared ball paths of the outer ball screw.

10. The rotary actuator of claim 1, wherein the rotary actuator is configured to rotate the inner shaft by about 60 degrees for every two inches or more of translation of the piston along the longitudinal center axis.

11. The rotary actuator of claim 1, wherein the interlaced ball circuit includes a single continuous ball path passing through the inner ball screw and the outer ball screw, and includes at least nine ball starts for the ball bearings.

12. The rotary actuator of claim 1, wherein a speed of translation of the plurality of ball bearings within the inner ball screw is equal to a speed of translation of the plurality of ball bearings within the outer ball screw.

13. A hinged panel assembly comprising:
a first panel;
a second panel;
a revolute hinged joint interconnecting the first panel and the second panel, and having an axis of rotation; and
a rotary actuator connected to the revolute hinged joint, including:
a rotatable inner shaft connected to the axis of rotation of the revolute hinged joint;
a piston circumscribing the rotatable inner shaft, and configured to translate along a longitudinal center axis of the rotary actuator in response to fluid pressure;
an outer cylinder circumscribing the piston and having multiple fluid ports configured to admit the fluid pressure, wherein the rotatable inner shaft, the piston, and the outer cylinder are concentrically arranged with respect to the longitudinal center axis to form two concentric ball screws that together define an interlaced ball circuit having at least one shared ball path; and
a plurality of ball bearings positioned within the at least one shared ball path of the interlaced ball circuit, wherein translation of the piston along the longitudinal center axis in response to admission of the fluid pressure into the outer cylinder is operative to recirculate the plurality of ball bearings between the two concentric ball screws via the at least one shared ball path, and to rotate the piston and the inner shaft to thereby actuate the revolute hinged joint and change an angular position of the first panel with respect to the second panel.

14. The hinged panel assembly of claim 13, wherein the axis of rotation of the revolute hinged joint is coaxially aligned with the longitudinal center axis of the rotary actuator.

15. The hinged panel assembly of claim 13, further comprising at least one mechanical link connecting the rotatable inner shaft to the revolute hinged joint.

16. The hinged panel assembly of claim 13, wherein the piston is configured to separate the outer cylinder into multiple pressure cavities each in fluid communication with a respective one of the fluid ports of the outer cylinder.

17. The hinged panel assembly of claim 16, wherein the piston includes a pair of pistons, and the multiple fluid ports include an inner fluid port positioned at an approximate mid-point of the rotary actuator between the pair of pistons, and a pair of outer fluid ports flanking the inner fluid port.

18. A fixed-wing aircraft comprising:
a fuselage;
a pair of wings connected to the fuselage;
an empennage connected to the fuselage;
an aerodynamic flight control panel connected to one of the wings and/or to the empennage via a revolute hinged joint having an axis of rotation; and
a rotary actuator connected to the revolute hinged joint, including:
a rotatable inner shaft connected to the axis of rotation;
a piston circumscribing the rotatable inner shaft, and configured to translate along a longitudinal center axis of the rotary actuator in response to fluid pressure,
an outer cylinder circumscribing the piston and having multiple fluid ports configured to admit the fluid pressure, wherein the rotatable inner shaft, the piston, and the outer cylinder are concentrically arranged with respect to the longitudinal center axis to form two concentric ball screws that together define an interlaced ball circuit having at least one shared ball path, wherein the piston is configured to separate the outer cylinder into multiple pressure cavities, and the multiple fluid ports are configured to connect the fluid pressure supply to the multiple pressure cavities; and
a plurality of ball bearings positioned within the at least one shared ball path of the interlaced ball circuit, wherein translation of the piston along the longitudinal center axis in response to admission of the fluid pressure into the outer cylinder is operative to recirculate the plurality of ball bearings between the two concentric ball screws via the at least one shared ball path, and to rotate the piston and the inner shaft to thereby actuate the revolute hinged joint and change an angular position of the aerodynamic flight control panel.

19. The fixed-wing aircraft of claim 18, wherein an inner diameter of the outer cylinder includes a plurality of female threads of the outer ball screw, an outer diameter of the piston includes a plurality of male threads of the outer ball screw, an inner diameter of the piston includes a plurality of female threads of the inner ball screw, and an outer diameter of the inner shaft includes a plurality of male threads of the inner ball screw.

20. The fixed-wing aircraft of claim 18, wherein the piston includes a pair of pistons, and the multiple fluid ports include an inner fluid port positioned at an approximate mid-point of the rotary actuator between the pair of pistons, and a pair of outer fluid ports flanking the inner fluid port.

\* \* \* \* \*